United States Patent [19]
Matz et al.

[11] Patent Number: 5,516,223
[45] Date of Patent: May 14, 1996

[54] CORRECTION FLUID

[75] Inventors: Gary F. Matz, Rosslyn Farms, Pa.; Kimberly B. Sanborn, South Weymouth, Mass.

[73] Assignee: The Gillette Company, Boston, Mass.

[21] Appl. No.: 191,313

[22] Filed: Feb. 1, 1994

Related U.S. Application Data

[62] Division of Ser. No. 885,514, May 19, 1992, Pat. No. 5,338,775.

[51] Int. Cl.⁶ .............................. B43K 7/12; A46B 11/00
[52] U.S. Cl. ..................... 401/260; 401/129; 401/214; 401/268
[58] Field of Search .................... 401/214, 260, 401/264, 292, 129, 268

[56] References Cited

U.S. PATENT DOCUMENTS

| | | |
|---|---|---|
| 3,680,968 | 8/1972 | Schwartzman et al. ............... 401/260 |
| 3,829,224 | 8/1974 | Kloosterhouse ................... 401/260 X |
| 4,329,448 | 5/1982 | Cox et al. . |
| 4,572,691 | 2/1986 | Kirchhoff et al. ................. 401/260 X |
| 4,671,691 | 6/1987 | Case et al. . |
| 4,686,624 | 8/1987 | Gajria . |
| 4,726,845 | 2/1988 | Thompson et al. . |
| 4,786,198 | 11/1988 | Zgambo . |
| 4,812,071 | 3/1989 | Batra ................................... 401/260 X |
| 4,917,521 | 4/1990 | Lai ....................................... 401/260 |
| 4,923,317 | 5/1990 | Bishop et al. ..................... 401/260 X |
| 4,971,628 | 11/1990 | Loftin . |
| 5,013,361 | 5/1991 | Case et al. . |
| 5,048,992 | 9/1991 | Loftin . |
| 5,056,949 | 10/1991 | Petrillo ............................... 401/260 X |
| 5,338,775 | 8/1994 | Matz et al. ............................ 523/161 |

FOREIGN PATENT DOCUMENTS

| | | |
|---|---|---|
| 3-919-588 | 12/1989 | Germany . |
| 57-80467 | 5/1982 | Japan ................................... 401/260 |
| 1-261473 | 10/1989 | Japan . |
| 2-199180 | 8/1990 | Japan . |
| 891-730 | 12/1981 | U.S.S.R. . |

*Primary Examiner*—Steven A. Bratlie
*Attorney, Agent, or Firm*—Fish & Richardson

[57] ABSTRACT

An aqueous, correction fluid that includes a suspending agent, a binding resin, water, and an opacifying pigment. The suspending agent is preferably a gum or hydrocolloid, e.g., xanthan gum, and the composition preferably has a shear-thinning index (n) of from about 0.08 to 0.50.

7 Claims, 1 Drawing Sheet

CORRECTION FLUID

This is a divisional of application Ser. No. 07/885,514, filed May 19, 1992 now U.S. Pat. No. 5,338,775.

BACKGROUND OF THE INVENTION

This invention relates to correction fluids.

Correction fluids are used for correcting handwritten, typewritten or photocopied markings on paper. Generally, correction fluids are applied to a paper surface in liquid form. After application, the fluids dry relatively quickly to provide a film which can effectively cover erroneous markings on the surface and can receive a corrected marking. It is desired that the dried film be strongly bonded to the paper surface, and sufficiently flexible that the film will not be removed under normal conditions. It is also desired that the composition dry at a rapid rate. Other desired performance characteristics include good storage stability, and flow and viscosity characteristics which permit easy and even application of the fluid.

Correction fluids typically contain a binding resin that provides the flexible film, and an opacifying pigment, usually titanium dioxide, dispersed in a solvent. It is desirable, for environmental reasons, that correction fluids include little or no volatile organic solvents.

Correction fluids are often supplied in a small bottle with an applicator brush attached to the cap. Since the opacifying pigment in the fluid (typically titanium dioxide) tends to settle out over time, glass or metal mixing beads are sometimes included to help redisperse the agent, the user being instructed to shake the bottle prior to use. However, thorough shaking is commonly regarded as a nuisance, so that much of the opacifying pigment remains at the bottom of the bottle. This condition is exacerbated by evaporation of the solvent component when the bottle is open. Accordingly, much of the correction fluid in each bottle may be thrown away as the solids become increasingly difficult to redisperse.

SUMMARY OF THE INVENTION

In general, the invention features, in one aspect, an aqueous correction fluid having a shear-thinning index of between 0.08 and 0.50. The correction fluid includes a binding resin, an opacifying pigment, e.g., titanium dioxide, water, and a sufficient quantity of a suspending agent to provide the fluid with the above shear-thinning index.

The invention features, in another aspect, a correction fluid dispensing system that includes a container and a correction fluid. The container includes a chamber for holding the correction fluid, and a capping element that fits over an opening in the chamber wall. The capping element includes a brush element that extends into the chamber when the capping element covers the opening. The correction fluid includes water, an opacifying pigment, a suspending agent, and a binding resin.

The invention features, in another aspect, an aqueous correction fluid, which includes a binding resin, at least 15% of an opacifying pigment, water, and a suspending agent.

The invention features, in another aspect, a correction fluid dispensing system including a pen having a chamber for holding a correction fluid, the chamber being defined by a wall including an opening, and a spring loaded valve at said opening for controlling flow of the fluid through the opening. The dispensing system includes a correction fluid within the chamber. The correction fluid contains a binding resin, an opacifying pigment, a suspending agent, and water.

The invention features, in another aspect, a process for covering a marking on a paper. The method includes contacting an applicator with a correction fluid having a shear-thinning index of between 0.08 and 0.50. The applicator may be any suitable applicator for use with fluid compositions, e.g., a brush or a pen tip. The fluid contains a binding resin, an opacifying pigment, a suspending agent, and water. The contacting is done with sufficient force that some of the gelled correction fluid flows onto the applicator. The correction fluid on the application is used to cover a marking on a paper surface, and the correction fluid is then allowed to dry. A corrective marking may subsequently be applied to the dried correction fluid, if desired.

The correction fluids of the invention include a suspending agent to provide shear thinning fluids, i.e., fluids which exhibit non-newtonian properties. By this, it is meant that the fluids are relatively thick at rest, and do not readily flow out of a container if the container is inverted. Yet the fluids thin out when sheared, and are thus easily applied to a surface because they flow readily onto an applicator, e.g., a brush, when the applicator actively contacts the fluids. The fluids also flow readily from the applicator to a surface when the applicator is passed across the surface.

Significantly, because of the non-newtonian properties of the fluids, the opacifying pigment in the gelled correction fluids does not significantly settle over extended periods of time, eliminating or reducing the need to shake the fluid container. Advantageously, the thixotropic flow properties allow the fluids of the invention to be dispensed using a wide variety of dispensers. In particular, due to the non-settling nature and resistance to viscosity change with change in temperature of the fluid, the fluid can be dispensed from a pen dispenser without "gushing" or other problems usually encountered. Further, the fluid does not normally require shaking before use, and can be used over long periods of time without settling or drying out. In addition to the advantageous flow properties, the compositions have good drying, bonding, flexibility and storage stability characteristics.

The non-newtonian properties of the gel may be measured in terms of the shear-thinning index (n), as described, e.g., in Zgambo, U.S. Pat. No. 4,786,198 ("Zgambo"), the disclosure of which is hereby incorporated by reference. For the purposes of this invention, the shear-thinning index (n) is calculated by fitting shear stress (T) and shear rate values (y) obtained from rheological measurements on a viscometer, e.g., a HAAKE ROTOVISCO, Haake Inc., Saddle Brook, N.J., to the empirical power equation $T=Ky^n$ (where K and n are calculated constants). As described in Zgambo, the shear-thinning index is obtained by measurements of an aqueous solution of the shear-thinning material at shear rates between about 30 and about 300 $sec^{-1}$. Shear stress values are measured from the curve on the viscometer at different shear rates (typically 30, 90, 150, 210 and 300 $sec^{-1}$) and the measured shear stress values are fitted to the shear rates using a curve-fitting program.

By "aqueous" it is meant that the fluid is water-based, and contains less than about 10% of volatile organic solvents.

Preferred compositions include, as the suspending agent, a gum or hydrocolloid, preferably a semi-synthetic gum, e.g. a cellulose derivative or microbial fermentation gum, more preferably xanthan gum, a titanium dioxide pigment, a acrylic polymer binder resin, and a phosphate ester dispersant. Preferably, the composition includes, by weight, about 2 to 20 percent binding resin; at least 15 percent pigment; about 0.2 to 2.0 percent dispersant; and about 0.15 to 0.6 percent suspending agent. They also include water. The drying time of preferred compositions is less than about 60 seconds; the viscosity at 40° C. is within ±10%, preferably ±5%, of the viscosity at 25° C.; and the shear thinning index (n) from 0.15 to 0.30. Preferred compositions have a settling value of about 10, when measured according to ASTM D869-48 (1974).

Other features and advantages of the invention will be apparent from the description of the preferred embodiment thereof, and from the claims.

DESCRIPTION OF THE PREFERRED EMBODIMENT

Figure 1:
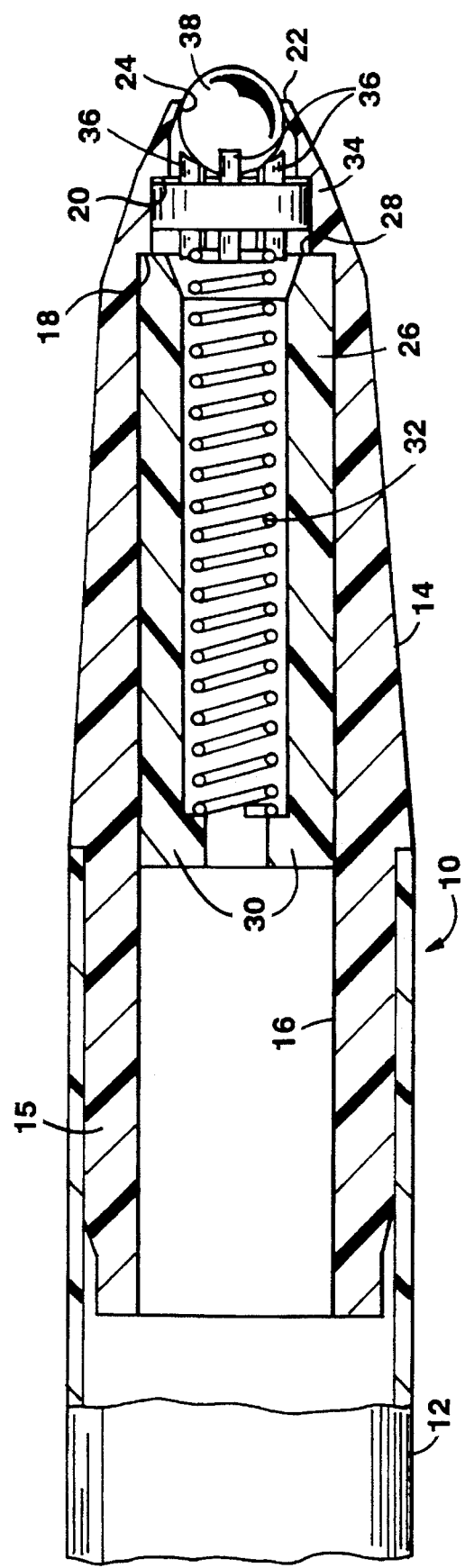

The figure is of a preferred correction fluid dispensing system.

The preferred correction fluid includes a suspending agent, a binding resin, a dispersing agent, an opacifying pigment, and water.

The flow and settling characteristics of the fluid are provided by the suspending agent. The suspending agent is dispersed in the composition to provide a correction fluid having a shear-thinning index (n) of between about 0.08 to about 0.50, more preferably between about 0.10 and 0.30, and most preferably between about 0.15 to about 0.25. Too low a shear-thinning index may result in a fluid that does not have sufficient flow to be easily applied; too high a shear-thinning index may result in a fluid that gushes or that exhibits settling of the pigment.

Inclusion of the suspending agents provides correction fluids which are thickened viscous liquids at rest or low shear rates. For example, compositions of the invention preferably have a viscosity of between 400 and 2000 cPs, more preferably between about 500 and 1000 cPs, at a shear rate of 30 $sec^{-1}$. However, in response to the high shear rates encountered during application of the composition, e.g., by brushing, the compositions undergo shear-thinning and have an estimated viscosity of less than about 5 cPs (obtained by extrapolation from the log curves of shear rate and shear stress).

The preferred fluids also do not undergo a significant change in viscosity in response to temperature. Particularly preferred fluids are those in which the viscosity at 40° C. is within ±10%, preferably ±5%, of the viscosity at 25° C.

The preferred suspending agents are gums or hydrocolloids. The gums or hydrocolloids may be natural gums such as plant exudates, e.g., tragacanth, seaweed extracts, e.g., carrageenan, and alginates. The gums can also be semi-synthetic gums such as cellulose derivatives, e.g., carboxymethylcellulose, guar and locust bean gum, and hydroxyethylcellulose, or microbial fermentation gums, e.g., as xanthan gum. Xanthan gum is a particularly preferred suspending agent. Preferred grades of xanthan gum are available under the tradenames KELZAN M, KELZAN S, and KELTROL, commercially available from The Kelco Company. KELZAN S and KELTROL are easier to disperse, requiring less agitation than KELZAN M.

The amount of suspending agent included in the composition can vary, depending on the flow properties desired and the other components selected. It is preferred that a sufficient quantity of the suspending agent be included to provide a viscosity of from about 500 to 1000 cPs at a shear rate of 30 $sec^{-1}$, and a viscosity of from about 60 to 130 cPs at a shear rate of 300 $sec^{-1}$. Typically, the correction fluids contain, by weight, about 0.15 to 0.6 percent of the suspending agent, preferably about 0.20 to 0.50 percent.

The binding resin may be any polymeric or monomeric resin which is capable of binding the pigment component to provide, after drying of the correction fluid, a dry, coalesced residue which is substantially water insoluble. It is further desirable that the residue be receptive to ink, e.g. to markings rewritten over the corrected mark.

Many conventional binding resins that can be used in the fluids are well-known to those skilled in the art. The preferred resins are acrylic polymers, in particular acrylic thermoset polymeric materials, sold in the form of emulsions under the trade names CARBOSET and CARBOPOL by B. F. Goodrich. These preferred polymers have acid numbers below about 50, weight average molecular weights between about 15,000 and about 200,000, and glass transition temperatures between about 20° C. and about 70° C. Particularly preferred polymers have acid numbers between about 25 and 30, molecular weights between about 25,000 and 35,000, and glass transition temperatures between about 25° C. and 60° C. The emulsions normally have a solids level of about 35 to 60%.

Enough resin should be included in the fluid so that a consistent connective film will result, but not so much that the fluid will destabilize with time and thicken. The preferred composition contain about 2 to 20 weight percent binding resin, more preferably about 5 to 15 percent, and most preferably 8 to 12 percent.

In order to ensure that a stable composition is formed, i.e., to avoid flocculation, and to improve distribution of the pigment through the composition, a dispersing agent is employed. Suitable dispersing agents are those which are compatible with typewritten ink. Preferred dispersing agents are polysorbitans, phosphate esters, sodium alkyl polyether sulfonates, ethoxylated alcohol, nonyl phenoxy polyethylene oxide, and octyl phenoxy POE. Of these, organic phosphate esters are particularly preferred, e.g., those commercially available from GAF under the tradename GAFAC RD-510 and BG-510. It is preferred that the composition contain from about 0.2 to 2 weight percent dispersant, more preferably from 0.5 to 1.5 percent, and most preferably from 0.5 to 1.0 percent.

Any suitable opacifying pigment having adequate hiding power to cover a desired type of marking, e.g., typed or handwritten, on a paper surface, may be utilized in the compositions of the invention. Titanium dioxide is preferred, as it provides a basic white color which can be toned to meet a variety of requirements depending on the paper stock with which the correction fluid is to be employed. The grade of titanium dioxide is selected based upon the binding resin used, and the desired texture of the composition. For most applications, preferred grades of titanium dioxide are R-931, R-900 and R-901, available from E. I. Dupont de Nemours & Co., Wilmington, Del., and RXL, available from Tioxide, Quebec, Canada. Of these, R-931 is particularly preferred. It is preferred that the composition contain, by weight, at least 15 percent pigment, preferably about 20 to 60 percent, more preferably about 25 to 50 percent, and most preferably about 35 to 45 percent.

The amount of water in the fluid will depend upon the amount required to hydrate a given suspending agent and disperse the selected pigment. Normally, a water level of from about 35 to 65 weight percent, based on the total weight of the composition, will be suitable. The amount of water required to hydrate the Xanthan gum is normally between 33 and 50 weight percent of the total amount of water in the composition. The pigment dispersion contains the remaining 50 to 67 weight percent of the total amount of water in the composition.

The compositions of the invention can include other conventional ingredients. For example, chelating agents, such as sodium EDTA, are normally included in the fluid in amounts between 0.1 and 1.0 percent by weight to protect any metal parts in the dispenser against metal ions present in the water. Defoamers are also normally included.

Preferred compositions exhibit relatively short drying times (preferably less than 60 seconds). Compositions can be tested for drying time by applying the fluid on the marking to be corrected and at 5 second intervals determining the time when you can write over or type over the fluid without disturbing the surface of the corrected mark. Preferred compositions also exhibit very little settling over time. When settling is measured according to ASTM D2243-68, a "no change" or "slight" rating is typically obtained. When measured by the more quantitative settling measurement method outlined in ASTM D869-48 (1974), the compositions normally are rated about 8 to 10 on a scale of 1 to 10, where 10 is perfect suspension.

The fluid is preferably made in three stages.

First, the hydrocolloid is slowly added into approximately one third of the total amount of water to be used in the composition. This allows the hydrocolloid to be hydrated. Mixing is done at a very low shear, so as not to incorporate air into the mixture. The speed is monitored and increased, producing a small vortex as the hydrocolloid dispersion thickens.

Next, a pigment dispersion is prepared. The pigment is added into a solution of dispersant in water at a slow rate, to prevent agglomoration, and mixed at high shear until the pigment particle size is above 7 on a Hegman gage. High shear is required to break down the pigment particle size. A high speed dispersator from Ross and Sons may be used to prepare the pigment dispersion. Other equipment such as a sand mill, ball mill, Eiger Mill or Gaulin can be used to obtain the desired pigment particle size.

Last, the pigment dispersion is added slowly into the hydrocolloid solution using a low shear mixer. A small vortex is maintained during this step. Once all of the pigment dispersion is added, the resin is added slowly. Additional colorant may be added to tint the fluid to the desired color.

The following example illustrates the invention.

EXAMPLE

Three correction fluid compositions (samples 1–3) were prepared according to the invention, with formulations as shown in Table 1. These fluids were tested against two commercially available correction fluids, available from Gillette under the tradenames JUST FOR COPIES® (control 1) and MISTAKE OUT® (control 2). Each fluid was tested for shear-thinning index (n), using a HAAKE ROTO-VISCO viscometer at 0 to 300 sec$^{-1}$ shear rates, and temperature stability using the same procedure at 25° and 40° C. The fluids were also tested for opacity, drying time, and flexibility and adhesion.

Opacity was measured by preparing draw downs of the fluids with a 0.001" Bird Bar on Leneta No. 18A charts. The charts have a black and white surface which the fluid covers. A contrast ratio measurement was made with a colorimeter and the ratio of the black reading to the white surface reading was calculated to obtain the result.

Flexibility and adhesion is measured by a fold test. The fluid is applied to a marking on a paper substrate and allowed to dry. The paper is then folded inwardly and creased, and folded crosswise and creased again. The dried correction fluid is then examined for cracking (indicating poor flexibility) or flaking off (indicating poor adhesion). Results are expressed on a scale of 1 to 5, with 5 indicating no craking or flaking.

The results of this testing are shown in Table 2. The fluids exhibit very little change in their viscosity, on the average less than 5%, over the temperature change which would typically be encountered if a fluid in a dispenser at room temperature (25° C.) were subjected to the heat of the hand of a user holding the dispenser (40° C.). The fluids also exhibit significantly lower shear thinning indices (about 0.20 average) compared to the control fluids (greater than 0.60), indicating that the fluids will resist settling, but will shear thin during use to an advantageously low viscosity. The other properties of the fluids are similar to those of the control fluids.

TABLE 1

| Ingredients | Vendor | Purpose | Sample 1 | Sample 2 | Sample 3 |
| --- | --- | --- | --- | --- | --- |
| Deionized Water | — | Solvent | 46.4 | 47.4 | 47.3 |
| Sodium EDTA | W. R. Grace | Chelating agent | 0.26 | 0.3 | 0.3 |
| Kelzan M | Kelco | Suspending agent | 0.22 | 0.3 | 0.4 |
| Germeben II | Sutton Lab | Preservative | 0.43 | 0.5 | 0.5 |
| TiO$_2$ R-931 | Dupont | Pigment | 41.50 | 40.0 | 40.0 |
| Gafac BG-510 | GAF | Dispersant | 0.75 | 1.0 | 1.0 |
| RES 3680 | Unocal 76 | Binder | 10.43 | 10.5 | 10.5 |

TABLE 2

|  | Sample 1 | Sample 2 | Sample 3 | Control 1 | Control 2 |
| --- | --- | --- | --- | --- | --- |
| Viscosity |  |  |  |  |  |
| 30 sec$^{-1}$ |  |  |  |  |  |
| @ 25° C. | 459.5 | 564.2 | 785.5 | 303.8 | 358.1 |
| @ 40° C. | 455.7 | 553.4 | 802.9 | 217.0 | 282.1 |
| 300 sec$^{-1}$ |  |  |  |  |  |
| @ 25° C. | 70.9 | 97.7 | 130.2 | 166.0 | 176.9 |
| @ 40° C. | 71.6 | 89.0 | 124.8 | 106.3 | 120.4 |
| Shear Thinning Index |  |  |  |  |  |
| @ 25° C. | 0.22 | 0.23 | 0.22 | 0.74 | 0.70 |
| @ 40° C. | 0.20 | 0.20 | 0.19 | 0.70 | 0.63 |
| Opacity | 0.998 | 0.998 | 0.998 | N/T | N/T |
| Dry Time (secs.) | 40 | 45 | 45 | N/T | N/T |
| Flexibility/ Adhesion | 5 | 5 | 5 | N/T | N/T |

*N/T indicates not tested.

The preferred correction fluids can be applied using conventional bottle and brush dispensers, rolling ball systems, or a squeeze bottle or pen. Advantageously, the flow properties of the fluids of the invention prevent gushing of the fluid when applied from a pen dispenser, a common problem with conventional fluids. Preferably, a squeeze bottle or pen is used, and a spring loaded valve will be provided to control rate of dispensing. A preferred spring loaded pen dispenser is shown in FIG. 1 and disclosed in U.S. Pat. No. 5,056,949, the disclosure of which is incorporated herein by reference. When a pen dispenser is used, it is preferred that the viscosity of the fluid be from about 400 to 600 cPs measured at 30 sec$^{-1}$.

Referring to FIG. 1, dispenser 10 comprises elongated body member 12 and barrel 14. A tubular passage 16 extends through barrel 14 and opens rearwardly into body member 12 for flow of correction fluid from the body member into barrel 14. Tubular passage 16 has a pair of circumferential shoulders 18 and 20 adjacent the forward end thereof, and is tapered inwardly terminating at a circular rim 22 surrounding and forming an orifice 24. Within tubular passage 16, a tubular spring retainer 26 is disposed in interfitting engagement with barrel 14, tubular spring retainer 26 having an external surfae providing for a force fit into tubular passage 16 such that forward surface 28 of the retainer has an outward portion contacting circumferential shoulder 18 and a portion extending radially inwarding into passage 16. Retainer 26 has an inwardly projecting portion 30 which serves to support a spring 32, the spring being of a diameter to closely fit within the inner wall of tubular spring retainer 26. A socket member 34 having a plurality of axial ribs 36 is supported by spring 32 at its forward end and a spherical ball 38 is disposed between socket member 34 and circular rim 22 of passage 16. Spherical ball 38 is of larger diameter than the circular rim such that only a portion of the ball extends beyond orifice 24 with the outer surface of the ball forming a seal when contacting circular rim 22.

An alternative correction fluid dispersing system includes a container for storing one of the preferred correction fluids. The container includes a chamber, which is defined by a cylindrical wall. A cap fits over an opening in the wall. The cap includes a brush portion that extends into the chamber. In use, as the brush is moved through the correction fluid, the fluid that contacts the brush is exposed to relatively high shear and flows onto the brush. The fluid on the brush again thickens, and remains thickened until brushed across a marking on paper. The shear force of the fluid contacting the paper causes the fluid to shear thin and flow onto the paper, covering the marking. Once dry, a corrective marking can be applied.

Other embodiments are within the claims.

We claim:

1. A process for covering a marking on a paper comprising the steps of covering a marking on a paper surface with a gelled correction fluid comprising a binding resin, an opacifying pigment, a suspending agent and water, said correction fluid having a shear-thinning index of between 0.08 and 0.50, said correction fluid being capable of obscuring an underlying marking on a paper substrate and of providing a surface capable of receiving a corrective ink marking that can be easily read, and allowing said correction fluid covering said marking to dry.

2. A process of claim 1 further comprising the step of applying a corrective marking to the surface of the dried correction fluid.

3. A process of claim 1 wherein the suspending agent is a semi-synthetic gum.

4. A process of claim 1 wherein the opacifying agent is titanium dioxide.

5. A process of claim 1 wherein the correction fluid has a drying time of less than about 60 seconds.

6. A process of claim 1 wherein the marking is covered by applying the correction fluid to the paper substrate from a pen applicator.

7. A process of claim 1 wherein the marking is covered by applying the correction fluid to the paper substrate from a bottle and brush applicator.

\* \* \* \* \*